(12) United States Patent
Turcotte (10) Patent No.: US 12,467,377 B2
(45) Date of Patent: *Nov. 11, 2025

(54) LUBRICANT PUMP SYSTEM AND METHOD FOR AIRCRAFT ENGINE

(71) Applicant: PRATT & WHITNEY CANADA CORP., Longueuil (CA)

(72) Inventor: Hervé Turcotte, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,394

(22) Filed: Oct. 8, 2024

(65) Prior Publication Data

US 2025/0035007 A1 Jan. 30, 2025

Related U.S. Application Data

(63) Continuation of application No. 18/367,068, filed on Sep. 12, 2023, now Pat. No. 12,140,036, which is a
(Continued)

(51) Int. Cl.
*F01D 25/20* (2006.01)
*F01D 15/08* (2006.01)
(Continued)

(52) U.S. Cl.
CPC ............. *F01D 15/08* (2013.01); *F01D 25/20* (2013.01); *F02C 7/32* (2013.01); *F04C 15/0061* (2013.01);
(Continued)

(58) Field of Classification Search
CPC .... F02C 7/236; F02C 7/32; F02C 7/36; F04C 15/0061; F04B 23/04
See application file for complete search history.

(56) References Cited

U.S. PATENT DOCUMENTS 4,669,999 A * 6/1987 Miller ................ F16L 55/1007
464/10
5,326,232 A * 7/1994 McDonnel .......... F04C 15/0061
417/319

(Continued)

FOREIGN PATENT DOCUMENTS

CN 111005867 A 4/2020

OTHER PUBLICATIONS

European Patent Office, Communication re. extended European search report for European patent application No. 22178245.1 dated Oct. 31, 2022.

*Primary Examiner* — Justin D Seabe
(74) *Attorney, Agent, or Firm* — Norton Rose Fulbright Canada LLP (57) ABSTRACT

Lubricant pump systems and associated methods for aircraft engines are provided. The method includes receiving an input torque, dividing the input torque between a first load path receiving a first portion of the input torque, and a second load path receiving a second portion of the input torque. A first lubricant pump of the aircraft engine is driven via the first load path using the first portion of the input torque. A second lubricant pump of the aircraft engine is driven via the second load path using the second portion of the input torque. When a malfunction of the second lubricant pump occurs, the method includes ceasing to drive the first lubricant pump and the second lubricant pump using the input torque.

20 Claims, 4 Drawing Sheets

Related U.S. Application Data continuation of application No. 17/343,838, filed on Jun. 10, 2021, now Pat. No. 11,788,427.

(51) Int. Cl.
*F02C 7/32* (2006.01)
*F04C 15/00* (2006.01)

(52) U.S. Cl.
CPC .... *F05D 2220/323* (2013.01); *F05D 2240/60* (2013.01); *F05D 2260/311* (2013.01); *F05D 2260/4031* (2013.01)

(56) References Cited

U.S. PATENT DOCUMENTS

| | | |
|---|---|---|
| 6,575,709 B2 | 6/2003 | Howard |
| 7,805,947 B2 | 10/2010 | Moulebhar |
| 8,601,785 B2 | 12/2013 | Legare |
| 8,708,830 B2 | 4/2014 | Lisiecki |
| 8,991,242 B2 | 3/2015 | Benitah |
| 9,548,639 B2 | 1/2017 | Goi et al. |
| 9,759,094 B2 | 9/2017 | Hutto, Jr. |
| 10,138,816 B2 | 11/2018 | Yates |
| 10,823,080 B2 | 11/2020 | Wotzak |
| 11,002,318 B2 * | 5/2021 | Altamura ............... F16D 41/185 |
| 2013/0098058 A1 | 4/2013 | Sheridan |
| 2021/0156280 A1 | 5/2021 | Gebhard et al. |

* cited by examiner

FIG. 4

LUBRICANT PUMP SYSTEM AND METHOD FOR AIRCRAFT ENGINE

CROSS REFERENCE TO RELATED APPLICATION(S)

The present application is a continuation of U.S. patent application Ser. No. 18/367,068 filed on Sep. 12, 2023 and incorporated herein by reference, which is a continuation of U.S. patent application Ser. No. 17/343,838 filed on Jun. 10, 2021, issued as U.S. Pat. No. 11,788,427 and incorporated herein by reference.

TECHNICAL FIELD

The disclosure relates generally to aircraft engines, and more particularly to lubrication systems of aircraft engines.

BACKGROUND

A typical aircraft engine has a lubrication system to meet the lubrication and cooling needs of various components of the engine. The lubrication system can deliver oil from an oil tank to the various components within the engine, recover the used oil from the components, and return the recovered used oil back to the oil tank for recirculation. The arrangement of the pumps of the lubrication system of an aircraft engine can be bulky and require complex and/or cumbersome plumbing. Improvement is desirable.

SUMMARY

In one aspect, the disclosure describes a lubricant pump system for an aircraft engine. The lubricant pump system comprises:
  a source of motive power;
  a first lubricant pump drivingly connected to the source of motive power via a first load path receiving a first portion of the motive power;
  a second lubricant pump drivingly connected to the source of motive power via a second load path receiving a second portion of the motive power, the second load path being separate from the first load path, the second portion of the motive power being different from the first portion of the motive power; and
  a mechanical fuse operatively disposed between the source of motive power and the first load path, the mechanical fuse also being operatively disposed between the source of motive power and the second load path.

In another aspect, the disclosure describes a method of driving lubricant pumps of an aircraft engine. The method comprises:
  receiving an input torque;
  dividing the input torque between a first load path receiving a first portion of the input torque, and a second load path receiving a second portion of the input torque;
  driving a first lubricant pump of the aircraft engine via the first load path using the first portion of the input torque;
  driving a second lubricant pump of the aircraft engine via the second load path using the second portion of the input torque; and
  when a malfunction of the second lubricant pump occurs, ceasing to drive the first lubricant pump and the second lubricant pump using the input torque.

In a further aspect, the disclosure describes an aircraft engine comprising:
  a lubrication load;
  a supply pump operatively connected to deliver lubricant to the lubrication load;
  a scavenge pump operatively connected to recover the lubricant from the lubrication load;
  a first drivetrain defining a first load path between a source of motive power and the supply pump, the first drivetrain being drivingly connected to the source of motive power via a frangible connection; and
  a second drivetrain defining a second load path between the source of motive power and the scavenge pump, the second load path being separate from the first load path, the second drivetrain being drivingly connected to the source of motive power via the frangible connection.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure describes lubrication systems of aircraft engines and methods of operating such lubrication systems. In some embodiments, the systems and methods described herein may promote safe utilization an efficient packaging (i.e., use of space) of lubricant pumps associated with an aircraft engine. In some embodiments, the systems and methods described herein may promote simplified plumbing by, for example, segregating lubricant supply lines of supply pumps from lubricant return lines of scavenge pumps. In some embodiments, the systems and methods described herein may be configured to, as a fail-safe, automatically stop one or more supply pumps in the event of a malfunction of one or more scavenge pumps. This may cause lubricant supply to a lubrication load from which the lubricant is no longer being recovered to be reduced or stopped. In some situations, this may potentially impede an escalation of the malfunction by stopping flammable lubricant from being supplied to a region of the aircraft engine potentially prone to cause ignition of the lubricant for example.

The terms "engaged", "connected" or "coupled" may include both direct engagement, connection or coupling (in which two elements contact each other) and indirect engagement, connection or coupling (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

Figure 1:
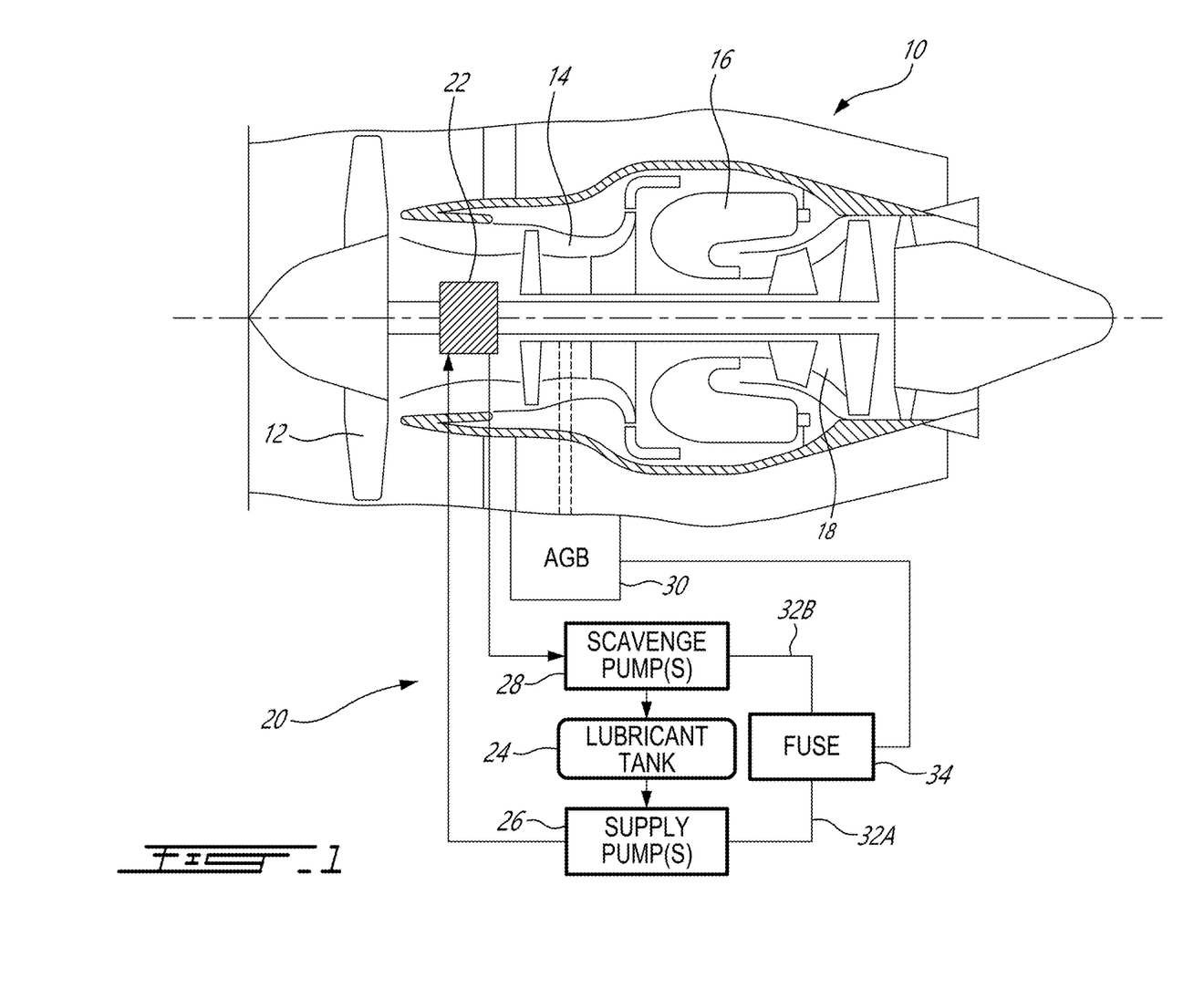
FIG. 1 shows a schematic axial cross-section view of an exemplary aircraft engine including a lubricant pump system as described herein.

FIG. 1 shows a schematic representation of aircraft engine 10 (referred hereinafter as "engine 10"). Engine 10 is illustrated as a turbofan gas turbine engine as an example. However, it is understood that the systems and methods described herein are also applicable to other types of aircraft engines such as turboshaft and turboprop gas turbine engines for fixed-wing and/or rotary wing aircraft applications for example. Engine 10 may suitable for use in (e.g., subsonic flight) aircraft applications. Engine 10 may include, in serial flow communication, fan 12 through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases.

Engine 10 may include lubricant pump system 20 (referred hereinafter as "system 20"), which may be part of a lubrication system of engine 10 for servicing one or more lubrication loads 22 (referred hereinafter in the singular) of engine 10. Lubrication load 22 may include one or more bearings and/or gears that require lubrication and/or cooling. System 20 may include lubricant tank 24 and one or more supply pressure lubricant pumps 26 (referred hereinafter in as "supply pump(s) 26") in fluid communication with lubricant tank 24. Supply pump(s) 26 may be operatively connected to supply lubricant (e.g., lubricating fluid, oil) from lubricant tank 24 to lubrication load 22 of engine 10.

System 20 may include one or more scavenge lubricant pumps 28 (referred hereinafter as "scavenge pump(s) 28") that may drive (i.e., recover) used lubricant collected in one or more sumps of engine 10 back to lubricant tank 24 for recirculation. It is understood that some embodiments of system 20 may include additional components than those illustrated herein. Supply pump(s) 26 and scavenge pump(s) 28 may include gear type, gear-rotor type or other suitable type of pumps.

Supply pump(s) 26 and scavenge pump(s) 28 may be driven by any suitable source of motive power available such as electric motor(s), hydraulic motor(s), pneumatic motor(s) and/or one or more rotating/driven shafts of engine 10 being drivingly connected to supply pump(s) 26 and/or to scavenge pump(s) 28 via accessory gearbox 30 (referred hereinafter as "AGB 30") for example. In some embodiments as shown in FIG. 1, a single output (output pad) of AGB 30 may be used as a source of motive power (e.g., an input torque) to drive supply pump(s) 26 and scavenge pump(s) 28.

In some embodiments of system 20, supply pump(s) 26 and scavenge pump(s) 28 may be driven by AGB 30 via separate respective drivetrains 32A, 32B defining separate load paths. First drivetrain 32A and second drivetrain 32B may each include one or more shafts, gear(s), coupling(s), link(s), joint(s) and/or other components suitable for transferring (e.g., rotational) motive power. First drivetrain 32A may define a first load path receiving a first portion of the motive power from AGB 30 for driving supply pump(s) 26, and second drivetrain 32B may define a second load path receiving a second portion of the motive power for driving scavenge pump(s) 28. In other words, the motive power transferred to system 20 from AGB 30 may be divided (i.e., split) between the first load path defined by first drivetrain 32A and the second load path defined by second drivetrain 32B. The first load path defined by first drivetrain 32A, and the second load path defined by second drivetrain 32B may be separate from each other. The first portion of motive power transferred to the first load path may be different from the second portion of motive power transferred to the second load path. In other words, first drivetrain 32A and second drivetrain 32B may be configured as separate branches that drive different pumps (e.g., pump stacks) using different portions of the motive power input into system 20 from AGB 30 or otherwise.

The input motive power or input torque received at system 20 may be received via a suitable mechanical fuse 34 (referred hereinafter as "fuse 34") operatively disposed between the source of motive power and both the first and second load paths defined by first drivetrain 32A and second drivetrain 32B. Both first drivetrain 32A and second drivetrain 32B may be drivingly connected to the source of motive power via a single common fuse 34 so that an obstruction in first drivetrain 32A or in second drivetrain 32B may cause fuse 34 to break and simultaneously cause first drivetrain 32A and second drivetrain 32B to become drivingly disconnected from the source of motive power. Consequently, in the event of a malfunction of scavenge pump(s) 28, such as scavenge pump(s) 28 becoming seized or exhibiting an increased resistance to being driven via second drivetrain 32B, the breaking of fuse 34 would cause the driving of scavenge pump(s) 28 and of supply pump(s) 26 to cease. Similarly, in the event of a malfunction of supply pump(s) 26, such as supply pump(s) 26 becoming seized or exhibiting an increased resistance to being driven via first drivetrain 32A, the breaking of fuse 34 would cause the driving of scavenge pump(s) 28 and of supply pump(s) 26 to cease.

Fuse 34 may include any suitable frangible connection(s) suitable for transmitting motive power during normal operation of scavenge pump(s) 28 and supply pump(s) 26, and may be configured (e.g., designed, sized) to break/fail in the event of the motive power or torque being transferred exceeding a threshold indicative of a malfunction in first drivetrain 32A and/or in second drivetrain 32B. Fuse 34 may be of a type known as a "torque fuse". For example, fuse 34 may be sized to break/fail in the event of a malfunction of a single scavenge pump 28 or of a single supply pump 26. Fuse 34 may be a mechanical sacrificial part designed to break in the event of a malfunction that increases the resistance to rotational movement transferred to first drivetrain 32A and/or to second drivetrain 32B. In various embodiments, fuse 34 may include a shear pin, a shear neck, and/or a (e.g., Woodruff) key for example.

Figure 2:
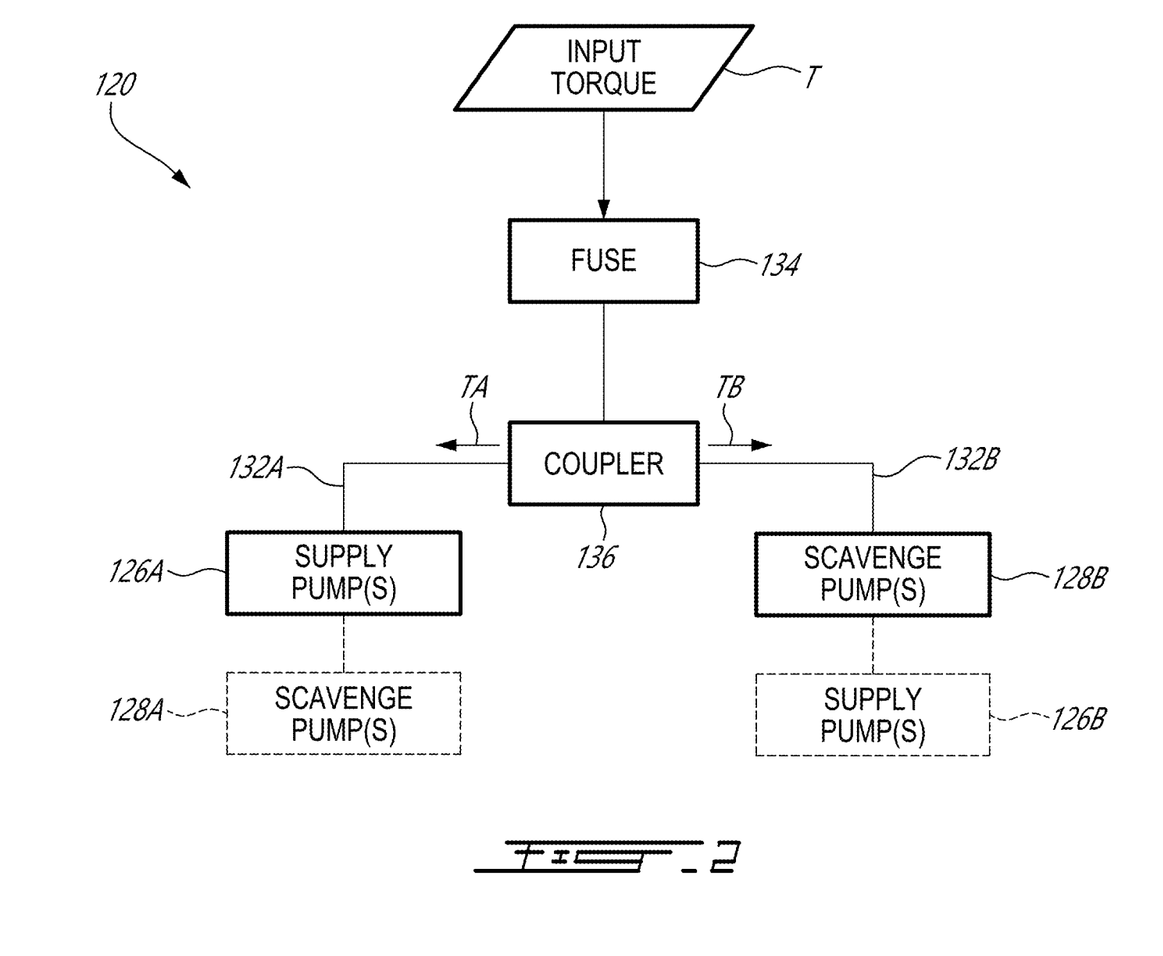
FIG. 2 is a schematic representation of an exemplary lubricant pump system of the aircraft engine of FIG. 1.

FIG. 2 is a schematic representation of another exemplary lubricant pump system 120 (referred hereinafter as "system 120") that may be part of a lubrication system of engine 10. Aspects of system 120 may be combined with other systems described herein. System 120 may include components of system 20 described above and like elements have been identified using reference numerals that have been incremented by 100.

Input torque T may be received from AGB 30 or other source of motive power and may be divided between the first load path defined by first drivetrain 132A and the second load path defined by second drivetrain 132B. Input torque T may be received and transferred to first drivetrain 132A and to second drivetrain 132B via fuse 134. Input torque T may be split into first torque portion TA delivered to first drivetrain 132A, and second torque portion TB delivered to second drivetrain 132B. First drivetrain 132A may be used to drive one or more supply pumps 126A and optionally one or more scavenge pumps 128A. Second drivetrain 132B may be used to drive one or more scavenge pumps 128B and optionally one or more supply pumps 126B. In various embodiments, first drivetrain 132A may be used to drive supply pump(s) 126A exclusively, or may be used to drive a combination of supply pump(s) 126A and scavenge pump(s) 128A. Similarly, in various embodiments, second drivetrain 132B may be used to drive scavenge pump(s) 128B exclusively, or may be used to drive a combination of scavenge pump(s) 128B and supply pump(s) 126B. In some embodiments, the pumps driven by first drivetrain 132A may be arranged serially along the first load path. In some embodiments, the pumps driven by second drivetrain 132B may be arranged serially along the second load path.

In some embodiments, input torque T may be transferred to first drivetrain 132A and second drivetrain 132B via coupler 136. Coupler 136 may include any suitable structure suitable to transfer motive power (e.g., input torque T) to both first drivetrain 132A and second drivetrain 132B. In other words, coupler 136 may serve to drivingly couple first drivetrain 132A and second drivetrain 132B to input torque T. In some embodiments, coupler 136 may include a suitable torque splitter capable of dividing input torque T into first torque portion TA delivered to first drivetrain 132A and second torque portion TB delivered to second drivetrain 132B. In some embodiments, coupler 136 may include a torque dividing gearbox having an input and two outputs for respectively driving first drivetrain 132A and second drivetrain 132B. In various embodiments, first torque portion TA delivered to first drivetrain 132A and second torque portion TB delivered to second drivetrain 132B may be substantially equal or may be different depending on the configuration of coupler 136 and on the number and type(s) of pumps that are driven by each of first drivetrain 132A and second drivetrain 132B. In some embodiments, coupler 136 may be configured as coupler 236 shown in FIG. 3 and described below.

Even though system 120 of FIG. 2 only shows two drivetrains respectively driving two pump stacks, it is understood that system 120 could include one or more additional drivetrains that are used to drive one or more additional pump stacks via fuse 134 using input torque T. In other words, input torque T and fuse 134 could be used to drive two or more drivetrains each driving one or more lubricant (e.g., supply and/or scavenge) pumps.

Figure 3:
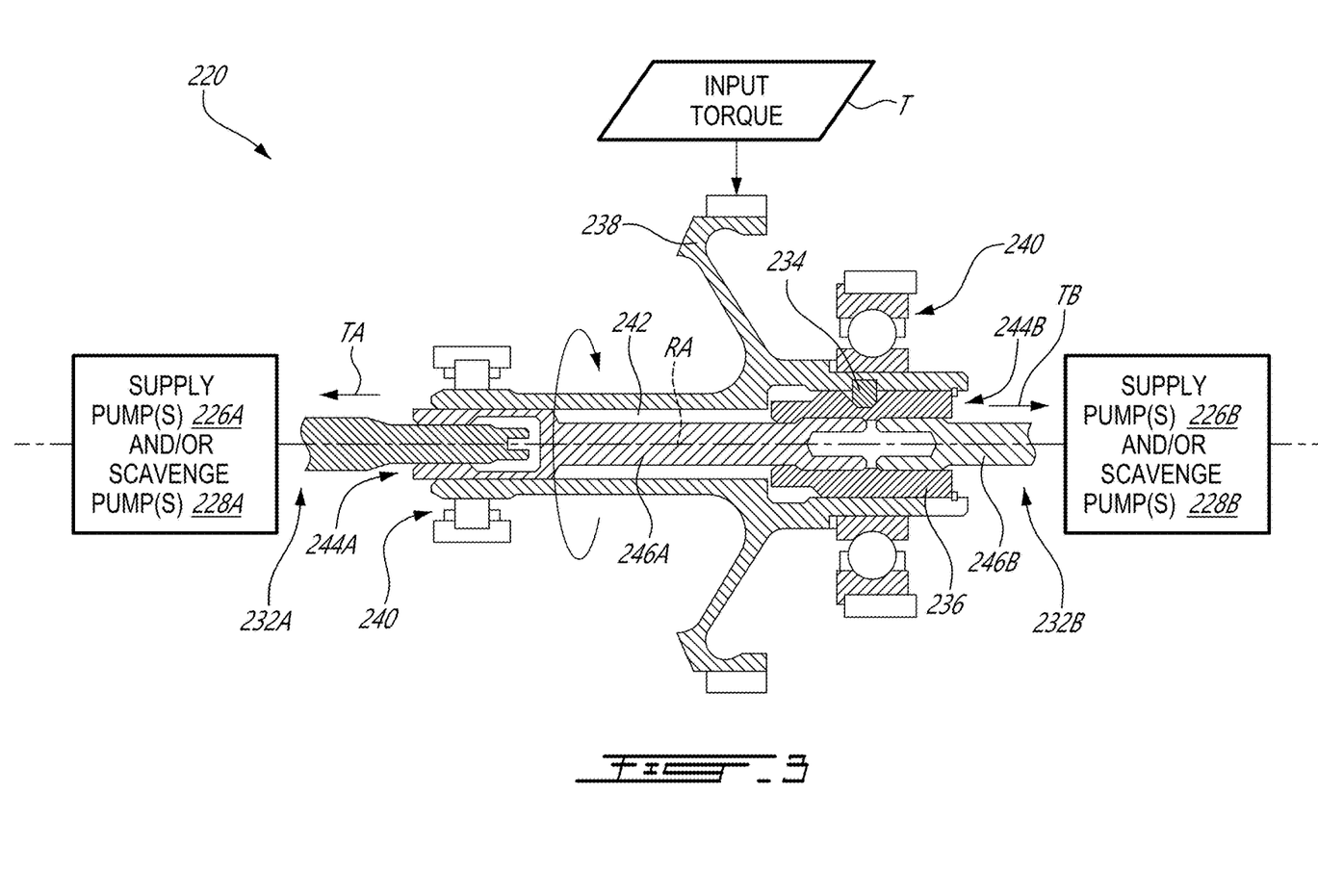
FIG. 3 is a schematic representation of another exemplary lubricant pump system of the aircraft engine of FIG. 1.

FIG. 3 is a schematic representation of another exemplary lubricant pump system 220 (referred hereinafter as "system 220") that may be part of a lubrication system of engine 10. Aspects of system 220 may be combined with other systems described herein. System 220 may include components of systems 20 and 120 described above. Like elements from system 120 have been identified using reference numerals that have been incremented by 100.

In some embodiments of system 220, the source of motive power may include drive gear 238, which may include an external toothed face receiving input torque T. Input torque T may be delivered to drive gear 238 from AGB 30 (shown in FIG. 1) or from another source of motive power and may be divided between the first load path defined by first drivetrain 232A and the second load path defined by second drivetrain 232B.

Input torque T may be transferred from drive gear 238 to first drivetrain 232A and to second drivetrain 232B via fuse 234. Input torque T may be split into first torque portion TA delivered to first drivetrain 232A and second torque portion TB delivered to second drivetrain 232B. First drivetrain 132A may be used to drive one or more supply pumps 226A and/or one or more scavenge pumps 228A. Second drivetrain 232B may be used to drive one or more scavenge pumps 228B and/or one or more supply pumps 226B.

Drive gear 238 may be rotatable about rotation axis RA. Drive gear 238 may be rotatably supported by a suitable structure of engine 10 via one or more bearings 240. In some embodiments, input torque T may be transferred to first drivetrain 232A and to second drivetrain 232B via coupler 236. Drive gear 238 may have a through central bore 242 extending along rotation axis RA. Central bore 242 may have first opening 244A, and second opening 244B axially opposite first opening 244A. The first load path defined by first drivetrain 232A may extend through first opening 244A of central bore 242 of drive gear 238. For example, first shaft 246A of first drivetrain 232A may extend into central bore 242 via first opening 244A and may be drivingly connected to coupler 236. Similarly, the second load path defined by second drivetrain 232B may extend through second opening 244B of central bore 242 of drive gear 238. For example, second shaft 246B of second drivetrain 232B may extend into central bore 242 via second opening 244B and may be drivingly connected to coupler 236.

Coupler 236 may be disposed inside central bore 242 of drive gear 238. In some embodiments, an axial position of coupler 236 relative to rotation axis RA may axially overlap an axial position of one or more bearings 240. In some embodiments, coupler 236 may have an annular (e.g., sleeve) configuration. For example, a radially-outer portion of coupler 236 may be drivingly connected with a radially-inner portion of drive gear 238 via fuse 234. In some embodiments, fuse 234 may define a frangible connection establishing torque transfer between coupler 236 and drive gear 238. In some embodiments, fuse 234 may include a Woodruff or other type of key that is engaged with both coupler 236 and with drive gear 238. Other types of frangible connections may be suitable.

Coupler 236 may be drivingly connected to both first shaft 246A and second shaft 246B. First shaft 246A of first drivetrain 232A may be drivingly connected to a first radially-inner portion of coupler 236. Second shaft 246B of second drivetrain 232B may be drivingly connected to a second radially-inner portion of coupler 236. The first and second radially-inner portions of coupler 236 may be axially-opposite radially-inner portions of coupler 36. In some embodiments, first shaft 246A and second shaft 246B may be drivingly connected to coupler 236 via one or more splined or other type of connections. The arrangement shown in FIG. 3 may result in the first load path defined by first drivetrain 232A, and the second load path defined by second drivetrain 232B being drivingly connected to drive gear 238 (and input torque) via the same fuse 234.

In some embodiments of system 220, first shaft 246A and second shaft 246B may be drivingly connected via coupler 236 for common rotation. In some embodiments of system 220, first shaft 246A and second shaft 246B may be drivingly connected for common rotation with drive gear 238. In some embodiments of system 220, first shaft 246A, second shaft 246B, coupler 236, fuse 234 and drive gear 238 may be drivingly connected for common rotation. In some embodiments, first shaft 246A may be coaxial with second shaft 246B. In some embodiments, first shaft 246A and second shaft 246B may be coaxial with drive gear 238.

Figure 4:
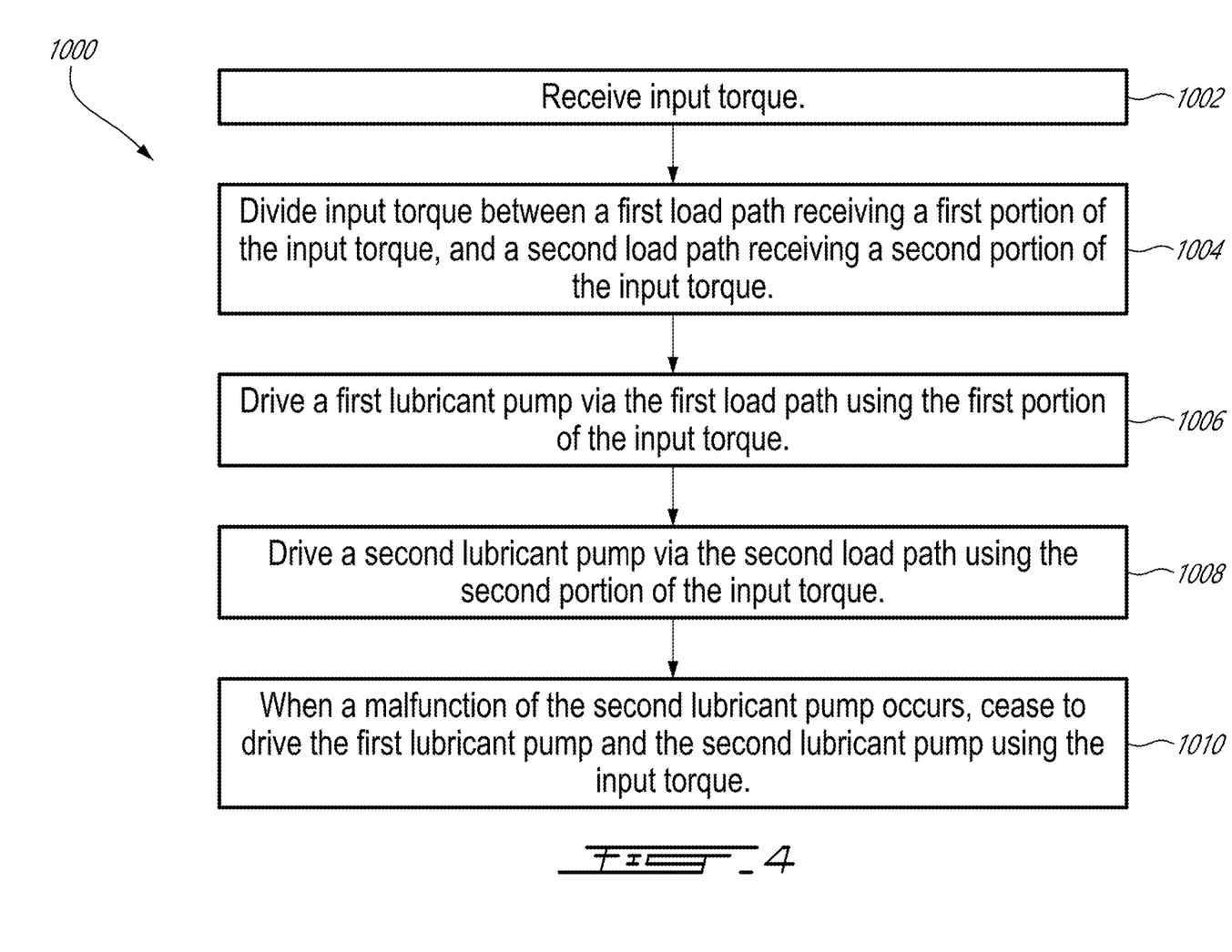
FIG. 4 is a flow diagram of a method of driving lubricant pumps of an aircraft engine.

FIG. 4 is a flow diagram of a method 1000 of driving lubricant pumps of engine 10 or of another aircraft engine. Aspects of method 1000 may be combined with other aspects or actions disclosed herein. Aspects of systems 20, 120 and 220 may be incorporated into method 1000. In various embodiments, method 1000 may include:
  receiving an input torque T (see block 1002);
  dividing input torque T between a first load path receiving first torque portion TA of input torque T, and a second load path receiving second torque portion TB of input torque T (see block 1004);

driving one or more first lubricant pumps of supply pump(s) 26 and/or scavenge pump(s) 28 via the first load path using first torque portion TA (see block 1006);

driving one or more second lubricant pumps of supply pump(s) 26 and/or scavenge pump(s) 28 via the second load path using second torque portion TB (see block 1008); and when a malfunction of the second lubricant pump(s) occurs, ceasing to drive the first lubricant pump(s) and the second lubricant pump(s) using input torque T (see block 1010).

In some embodiments of method 1000, the first lubricant pump may be supply pump 26 and the second lubricant pump may be scavenge pump 28.

Input torque T may be received via fuse 34. Ceasing to drive the first lubricant pump and the second lubricant pump using input torque T may include causing fuse 34 to break.

In some embodiments, the malfunction of the second lubricant pump may include seizing of the second pump. Ceasing to drive the first lubricant pump and the second lubricant pump using input torque T may include disconnecting the first load path and the second load path from input torque T.

In some embodiments, method 1000 may include substantially simultaneously disconnecting the first load path and the second load path from input torque T when the malfunction of the second (or first) lubricant pump occurs.

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

What is claimed is:

1. A lubricant pump system for an aircraft engine, the lubricant pump system comprising:
   a source of motive power;
   a first lubricant pump drivingly connected to the source of motive power via a first load path receiving a first portion of the motive power;
   a second lubricant pump drivingly connected to the source of motive power via a second load path receiving a second portion of the motive power, the second load path being separate from the first load path;
   a coupler drivingly connected to the source of motive power and drivingly interconnecting the first lubricant pump and the second lubricant pump together; and
   a mechanical fuse operatively disposed between the source of motive power and the coupler, the coupler transferring motive power from the source of motive power to both the first lubricant pump and the second lubricant pump via the mechanical fuse, the mechanical fuse including a frangible connection configured to:
   transmit motive power during normal operation of the first lubricant pump and the second lubricant pump; and
   break during a malfunction of the first lubricant pump and/or of the second lubricant pump.

2. The lubricant pump system as defined in claim 1, wherein the first lubricant pump is a supply pump and the second lubricant pump is a scavenge pump.

3. The lubricant pump system as defined in claim 1, wherein the first lubricant pump is one of a plurality of first lubricant pumps drivingly connected to the source of motive power via the first load path.

4. The lubricant pump system as defined in claim 3, wherein:
   the second lubricant pump is one of a plurality of second lubricant pumps drivingly connected to the source of motive power via the second load path;
   the first lubricant pumps include supply pumps; and
   the second lubricant pumps include scavenge pumps.

5. The lubricant pump system as defined in claim 1, wherein the mechanical fuse includes a shear pin, a shear neck and/or a key.

6. The lubricant pump system as defined in claim 1, wherein:
   the source of motive power includes a drive gear;
   the first load path includes a first shaft drivingly connected to the drive gear via the mechanical fuse; and
   the second load path includes a second shaft drivingly connected to the drive gear via the mechanical fuse.

7. The lubricant pump system as defined in claim 6, wherein:
   the drive gear is rotatable about an axis;
   the drive gear has a through central bore extending along the axis;
   the central bore has a first opening, and a second opening axially opposite the first opening;
   the first load path extends through the first opening of the central bore of the drive gear; and
   the second load path extends through the second opening of the central bore of the drive gear.

8. The lubricant pump system as defined in claim 6, wherein the first shaft and the second shaft are drivingly connected for common rotation with the drive gear.

9. The lubricant pump system as defined in claim 6, wherein the coupler is being drivingly connected to the drive gear via the mechanical fuse.

10. The lubricant pump system as defined in claim 9, wherein:
    the drive gear is rotatable about an axis;
    the drive gear has a central bore extending along the axis; and
    the coupler is disposed inside the central bore of the drive gear.

11. The lubricant pump system as defined in claim 10, wherein:
    the coupler has an annular configuration;
    a radially-outer portion of the coupler is drivingly connected with the drive gear via the mechanical fuse;
    the frangible connection establishes torque transfer between the coupler and the drive gear;
    the first shaft is drivingly connected with a first radially-inner portion of the coupler; and
    the second shaft is drivingly connected with a second radially-inner portion of the coupler.

12. A method of driving lubricant pumps of an aircraft engine, the method comprising:
    receiving an input torque via a mechanical fuse including a frangible connection;
    dividing the input torque between a first load path receiving a first portion of the input torque, and a second load path receiving a second portion of the input torque;
    driving a first lubricant pump of the aircraft engine via the first load path using the first portion of the input torque;

driving a second lubricant pump of the aircraft engine via the second load path using the second portion of the input torque; and when a malfunction of the second lubricant pump occurs, causing the frangible connection to break to disconnect the first load path and the second load path from the input torque and cease to drive the first lubricant pump and the second lubricant pump using the input torque.

13. The method as defined in claim 12, wherein the first lubricant pump is a supply pump and the second lubricant pump is a scavenge pump.

14. The method as defined in claim 12, wherein the malfunction of the second lubricant pump includes seizing of the second lubricant pump.

15. The method as defined in claim 12, comprising simultaneously disconnecting the first load path and the second load path from the input torque when either the malfunction of the second lubricant pump occurs or when a malfunction of the first lubricant pump occurs.

16. An aircraft engine comprising:
a lubrication load;
a supply pump operatively connected to deliver lubricant to the lubrication load;
a scavenge pump operatively connected to recover the lubricant from the lubrication load;
a first drivetrain defining a first load path between a source of motive power and the supply pump, the first drivetrain being drivingly connected to the source of motive power via a frangible connection; and
a second drivetrain defining a second load path between the source of motive power and the scavenge pump, the second load path being separate from the first load path, the second drivetrain being drivingly connected to the source of motive power via the frangible connection,
wherein the frangible connection is configured to:
transmit motive power during normal operation of the supply pump and the scavenge pump; and
break during a malfunction of supply pump and/or of the scavenge pump.

17. The aircraft engine as defined in claim 16, wherein:
the supply pump is one of a plurality of supply pumps drivingly connected to the source of motive power via the first drivetrain; and
the scavenge pump is one of a plurality of scavenge pumps drivingly connected to the source of motive power via the second drivetrain.

18. The aircraft engine as defined in claim 17, wherein:
the source of motive power includes a drive gear;
the first drivetrain includes a first shaft drivingly connected to the drive gear via the frangible connection; and
the second drivetrain includes a second shaft drivingly connected to the drive gear via the frangible connection.

19. The aircraft engine as defined in claim 18, comprising a coupler drivingly connecting the first shaft and the second shaft together, wherein the coupler is drivingly connected to the drive gear via the frangible connection.

20. The aircraft engine as defined in claim 18, wherein:
the drive gear is rotatable about an axis;
the drive gear has a through central bore extending along the axis;
the central bore has a first opening and a second opening axially opposite the first opening;
the first drivetrain extends through the first opening of the central bore of the drive gear; and
the second drivetrain extends through the second opening of the central bore of the drive gear.

\* \* \* \* \*